(12) United States Patent
Harmon et al.

(10) Patent No.: US 8,846,801 B1
(45) Date of Patent: Sep. 30, 2014

(54) SELF-HEALING POLYCARBONATE CONTAINING POLYURETHANE NANOTUBE COMPOSITE

(75) Inventors: Julie P. Harmon, Tampa, FL (US); Roger Bass, Wesley Chapel, FL (US)

(73) Assignee: University of South Florida, Tampa, FL (US)

(*) Notice: Subject to any disclaimer, the term of this patent is extended or adjusted under 35 U.S.C. 154(b) by 710 days.

(21) Appl. No.: 13/029,721

(22) Filed: Feb. 17, 2011

Related U.S. Application Data

(60) Provisional application No. 61/305,370, filed on Feb. 17, 2010.

(51) Int. Cl.
*C08G 18/44* (2006.01)
*C08G 18/30* (2006.01)
*C08G 18/40* (2006.01)
*C08L 75/02* (2006.01)
*C08L 69/00* (2006.01)
*C08G 18/00* (2006.01)

(52) U.S. Cl.
CPC ............... *C08G 18/44* (2013.01); *C08L 75/02* (2013.01); *C08G 18/30* (2013.01); *C08G 18/40* (2013.01); *C08L 69/00* (2013.01); *C08G 18/00* (2013.01)
USPC ............................. 524/495; 524/496; 524/612

(58) Field of Classification Search
CPC ........ C08G 18/00; C08G 18/44; C08G 18/30; C08G 18/40; C08L 69/00; C08L 75/02
USPC ........................................... 524/495, 496, 612
See application file for complete search history.

(56) References Cited

U.S. PATENT DOCUMENTS

| | | | |
|---|---|---|---|
| 5,648,151 A * | 7/1997 | Mizoguchi et al. | 428/220 |
| 6,426,134 B1 | 7/2002 | Lavin et al. | |
| 7,108,914 B2 | 9/2006 | Skipor et al. | |
| 2005/0271881 A1 * | 12/2005 | Hong | 428/423.1 |
| 2006/0135677 A1 | 6/2006 | Huang et al. | |
| 2008/0044651 A1 * | 2/2008 | Douglas | 428/339 |

OTHER PUBLICATIONS

Song et al., Development of Flexible Carbon Nanotube-Polymer Hybrid Thin Film for Strain Sensing, Electronic Components and Technology Conference, 2009, pp. 1-4.
Ye et al., Reinforcement and Rupture Behavior of Carbon Nanotubes-Polymer Nonofibers, Applied Physics Letters, 2004, vol. 85, No. 10, pp. 1775-1777.

* cited by examiner

*Primary Examiner* — Bijan Ahvazi
*Assistant Examiner* — David L Miller
(74) *Attorney, Agent, or Firm* — David P. Hendricks; Jeremy Spier; Smith & Hopen, P.A.

(57) ABSTRACT

Thermoplastic elastomers containing carbon nanotubes that is an autonomous, intrinsic, and reversible self healing polymer that requires no intervention to induce self healing, that requires no sequestered healing agents are added to the matrix, and is capable of multiple healing events.

8 Claims, 3 Drawing Sheets

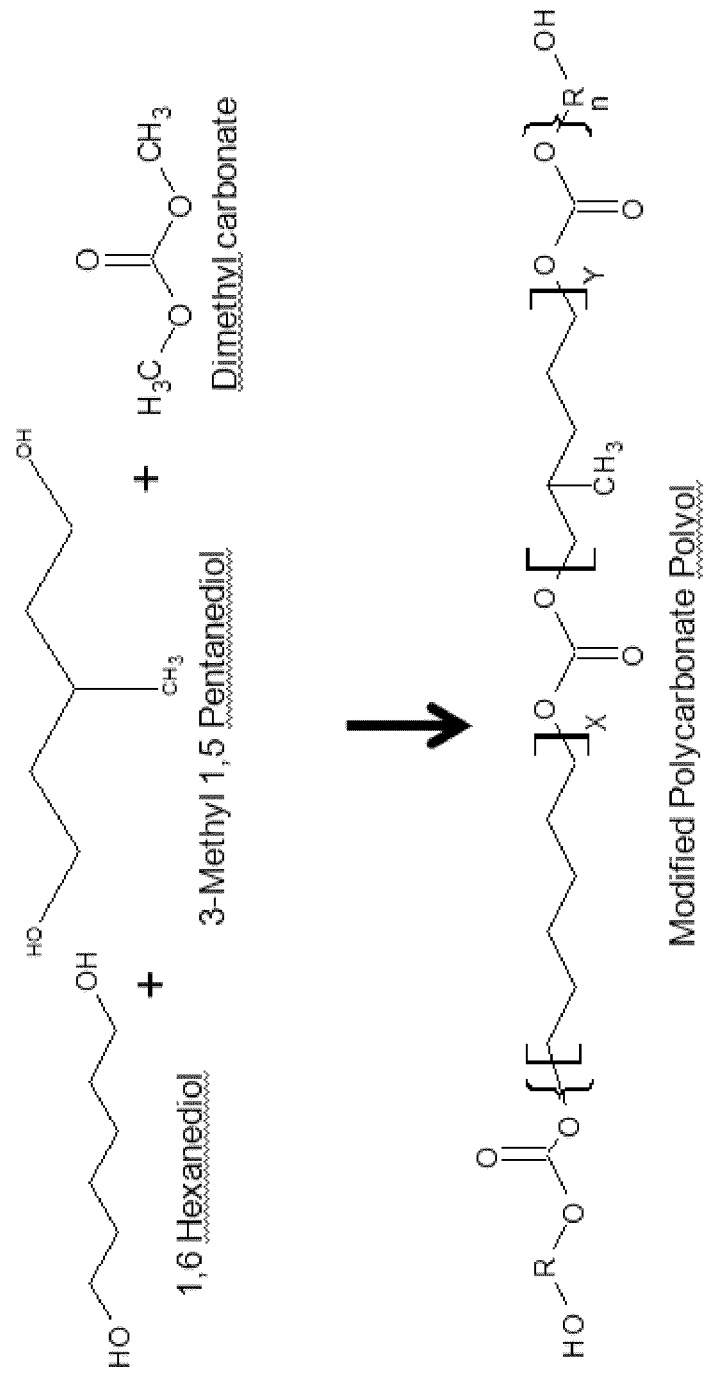
Figure 1. Example synthesis polycarbonate polyol

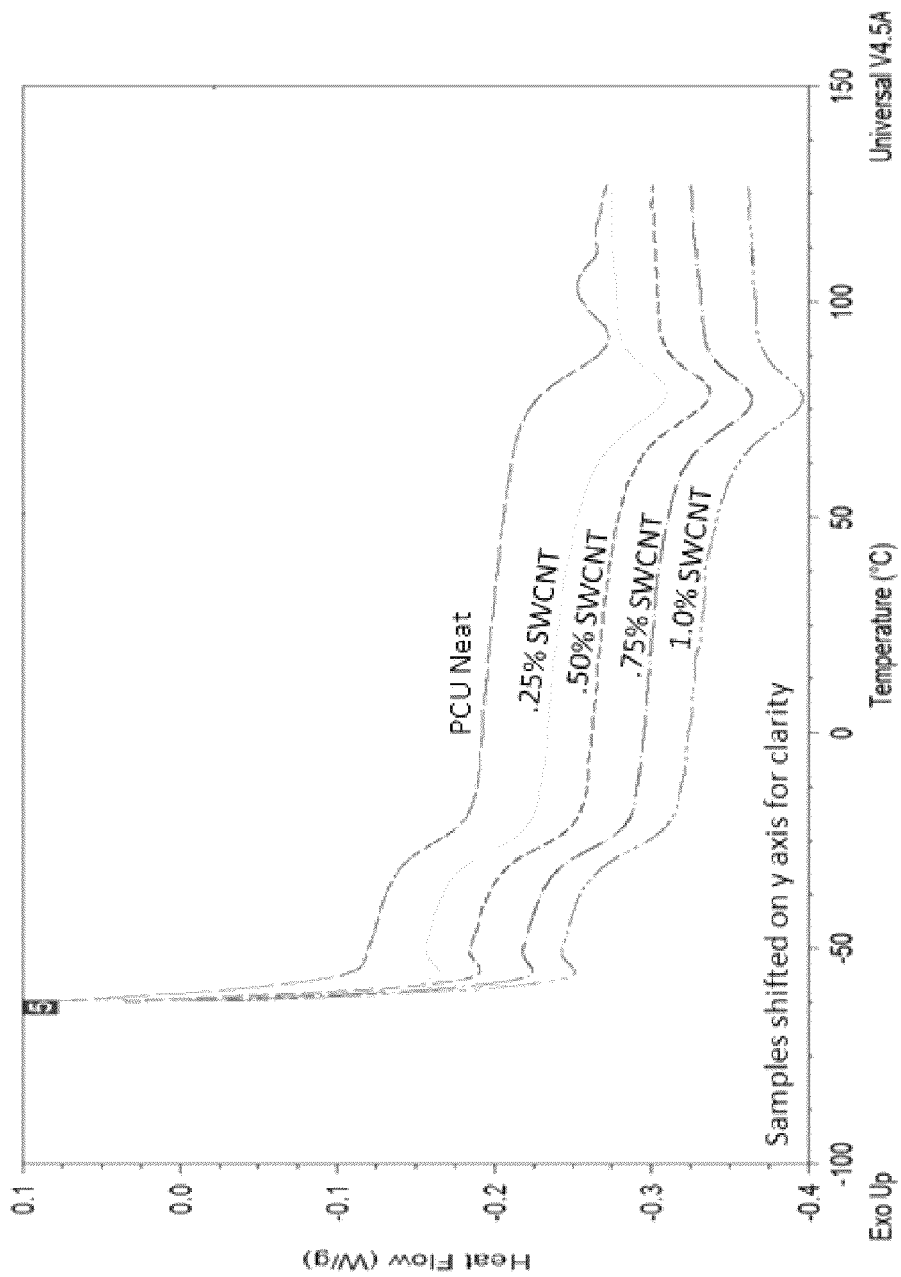
Figure 2. Example of composite glass transition temperatures

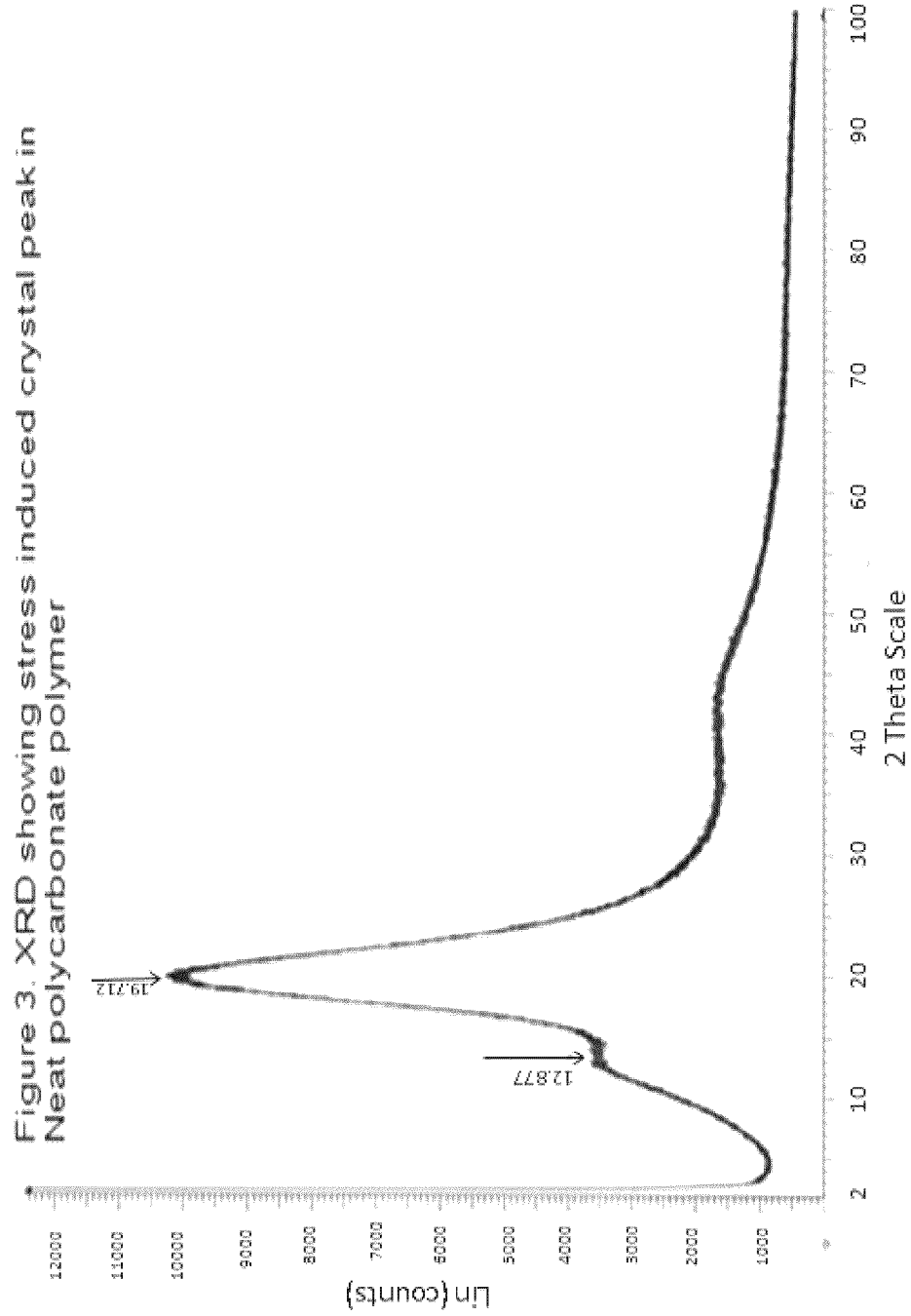

SELF-HEALING POLYCARBONATE CONTAINING POLYURETHANE NANOTUBE COMPOSITE

CROSS REFERENCE TO RELATED APPLICATIONS

This application claims priority to U.S. Provisional Patent Application No. 61/305,370, entitled "ULTRA-SOFT POLYURETHANE CONTAINING CARBON NANOTUBES DEMONSTRATING SELF-HEALING PROPERTIES," filed on Feb. 17, 2010, the contents of which are hereby incorporated by reference.

BACKGROUND OF THE INVENTION

1. Field of the Invention

This invention relates to thermoplastic elastomers containing carbon nanotubes. More specifically, it relates to self-healing polycarbonate-containing polyurethane (PCU) nanotube composites.

2. Description of the Related Art

Elastomers, polymers commonly known as rubbers, are widely utilized because of their ability to recover shape and dimension after being subjected to deformation forces (stress). The cycle of stress and recovery can normally be repeated; however, all rubbers suffer from mechanical degradation over time and usually results in failure of the structural integrity of the material. Similarly, shape memory polymers are now used in a wide variety of applications, including wrinkle free clothing, robotics, and medical field. Shape memory polymers usually exist in one of two states: the native state; and a different shape that is induced by some sort of additional stimulus, e.g., heat, light, electromagnetic radiation etc.

What is needed is an autonomous, intrinsic, and reversible self healing polymer that requires no intervention to induce self healing, that requires no sequestered healing agents are added to the matrix, and is capable of multiple healing events.

SUMMARY OF INVENTION

The claimed invention is soft polyurethane incorporated with carbon nanotubes that has exceptional mechanical properties and shape memory. Once structural failure occurs (break or rupture) it is repaired by simply bringing surfaces of freshley broken segments in contact with one another. This material can be used anywhere soft polyurethanes are appropriate.

The claimed invention is a self-healing polycarbonate-containing polyurethane (PCU) nanotube composite. The composite is autonomous, meaning no intervention is needed to induce healing (such as heat, light, continuous pressure or electrical stimulus). Healing, however, is accelerated by heat. The composite is also intrinsic, meaning no sequestered healing agents are added to the matrix. Moreover, the healing is reversible, meaning the composites and neat polymer are capable of multiple healing events.

In an embodiment, the claimed invention includes XP-28203 having a plurality of carbon nanotubes disposed in its matrix. XP-28203 is a limited commercially available thermoplastic polyurethane synthesized from methylene bis (4-cyclohexylisocyanate), 1,4 butanediol, and a modified polycarbonate copolymer PES EX-619 (produced by Hodogaya Chemical Co., Ltd) and is manufactured by TSE Industries, in Clearwater Fla. This material was developed for its ultra-soft characteristics while retaining high mechanical properties. It was found that XP-28203 containing one percent by weight carbon nanotubes shows an increase in break strength while retaining its ultra-soft configuration (Shore A<70) and demonstrates self-healing characteristic. Upon breaking, tearing, or cutting formed samples of the polyurethane containing carbon nanotubes, the fragmented surfaces can be rejoined and form a cohesive complex that retains some of the initial mechanical properties.

BRIEF DESCRIPTION OF THE DRAWINGS

For a fuller understanding of the invention, reference should be made to the following detailed description, taken in connection with the accompanying drawings, in which:

FIG. 1 is example synthesis polycarbonate polyol;

FIG. 2 is a graph depicting composite glass transition temperatures; and

FIG. 3 is a graph depicting XRC showing evidence of a quasi crystalline stress induced crystal peak in Neat polycarbonate polymer.

DETAILED DESCRIPTION OF THE PREFERRED EMBODIMENT

The claims invention is a thermoplastic elastomers that exhibit intrinsic self-healing that is enhanced by the incorporation of carbon nanotubes. The self-healing properties are enhanced by composites of the polycarbonate-containing polyurethane and single-wall (SW) or multi-wall (MW) carbon nanotubes (CNTs). The nanotubes are not used to encapsulate healing agents.

The polycarbonate polyol is unique in that it is a liquid at room temperature and the apparent lack of crystallinity leads to the creation of unusually soft polyurethanes (Shore A 60-70 hardness) while maintaining excellent physical and mechanical properties. The modified polyol of 2,000 a.m.u. contains 3-methyl-1,5-pentanediol. Appending a methyl group to the third position on pentanediol drastically alters the polyol. This modification impedes crystallization in the polyol and in the PCUs and significantly alters mechanical properties, shown in FIG. 1. This liquid diol is polymerized with 1,4 butanediol chain extender and dicyclohexyl-methane-4,4"-diisocyanate at hard segment ratios from 20-27%. (Hard segment ratio is defined as percent by weight of the isocyanate and chain extender.) These materials exhibit tensile strengths from 1500-3000 psi and reversible extensions of 500%. Importantly, differential scanning calorimetry shows a barely discernible melting range which disappeared in the second heating. This is important, since crystallinity is not desirable in autonomous self-healing thermoplastic materials where a more "liquid" matrix is needed.

Fully cured, intact surfaces do not adhere, however, once the surfaces are ruptured, the ruptured surfaces show a strong affinity for one another and when brought into contact self-mend.

A scale up batch of 23% hard segment PCU was used to produce single wall carbon nanotube (SWCNT) and multi-wall carbon nanotubes (MWCNT) composites containing 0.25 to 1.00% nanotubes by weight. Nanotubes were sonicated with polymer and tetrahydrofuran and the solvent was evaporated in a vacuum oven. Samples were molded to the appropriate geometry for testing. Differential scanning calorimetry was conducted on neat and filled samples. SWCNTs and MWCNTs had little or no effect glass transition temperatures (Table 1).

TABLE 1

PCPU Single & Multi-wall Cnt Composites

| Sample | $T_g$ °C. | $T_m$ °C. | J/g | G' (@15 Hz) (−20° C.)(Mpa) | Activation Energy (kcal/mol) |
|---|---|---|---|---|---|
| Neat PU | −26 | 89 | 2.9 | 121.7 | 128 |
| .25% SWCNT | −27 | 78 | 4.0 | | |
| .50% SWCNT | −27 | 77 | 4.2 | | |
| .75% SWCNT | −27 | 76 | 3.6 | | |
| 1.0% SWCNT | −27 | 76 | 3.6 | 231.8 | 136 |
| .25% MWCNT | −27 | 62 | 3.8 | | |
| .50% MWCNT | −27 | 63 | 3.7 | | |
| .75% MWCNT | −27 | 63 | 4.4 | | |
| 1.0% MWCNT | −27 | 61 | 4.3 | 78.3 | 209 |

This indicates that there is not a strong association between the nanotubes and polymer, or, possibly that the polymer segments are so flexible that the nanotubes move in association with the segments (a 14° C. increase in the glass transition temperature was observed in poly methyl methacrylate (PMMA) upon the addition of 0.26% by weight of SWCNTs). Small, broad endotherms were noted in the melt region of the PUs. Melt temperatures decreased slightly with the addition of nanotubes and to a greater extent with SWCNTs, as shown in FIG. 2. Endotherm area (J/g) increased slightly with nanotube content. X-ray analysis revealed a small peak at 2θ=10°. A sample of neat polymer was tested and no features were noted. However, after compressing the sample for 12 hours, a similar XRD plot was obtained indicating the development of ordered structure, as show in FIG. 3. Endotherm increases were not observed when samples were pulled in a tensile tester. All of this indicates that the polymer is on the verge of crystallizing, but lacks the long range order required for the development of well defined x-ray patterns.

Tensile tests were conducted at a crosshead speed of 4 inches per minute on the neat and composite samples. Five Samples were pulled for each formulation (Table 2).

TABLE 2

Tensile Test Results

| Sample: | Average stress @100% strain (MpA) | Average stress @300% strain (MpA) | Average stress @break (Mpa) | Average strain @break (% ini.) |
|---|---|---|---|---|
| Neat PCPU | 1.34 +/− .09 | 1.90 +/− .15 | 3.52 +/− 0.45 | 583.0 +/− 25.70 |
| 0.25% SWCNT | 3.02 +/− .15 | 6.57 +/− .35 | 9.00 +/− 0.30 | 445.4 +/− 12.76 |
| 0.50% SWCNT | 3.00 +/− .31 | 5.97 +/− .46 | 8.10 +/− 0.52 | 441.4 +/− 28.20 |
| 0.75% SWCNT | 2.36 +/− .06 | 5.30 +/− .15 | 6.90 +/− 0.87 | 434.0 +/− 60.26 |
| 1.0% SWCNT | 2.64 +/− .11 | 5.80 +/− .27 | 7.70 +/− 0.28 | 442.4 +/− 20.90 |
| 0.25% MWCNT | 2.50 +/− .14 | 4.59 +/− .16 | 11.30 +/− 1.90 | 459.0 +/− 28.20 |
| 0.50% MWCNT | 3.24 +/− .15 | 7.22 +/− .32 | 9.80 +/− 0.49 | 444.2 +/− 12.40 |
| 0.75% MWCNT | 2.96 +/− .09 | 6.33 +/− .14 | 8.20 +/− 0.35 | 439.2 +/− 10.90 |
| 1.0% MWCNT | 3.06 +/− .17 | 6.53 +/− .27 | 8.50 +/− 0.37 | 443.8 +/− 22.70 |

An additional test was conducted to compare healing after samples were subjected

TABLE 3

Healed Tensile Test Results

| Sample: | Average stress @break (Mpa) | Average strain @break (% ini.) |
|---|---|---|
| Neat PCPU Heal@RT | 3.4 +/− 4.74 | 321.6 +/− 354.00 |
| .25% SW Heal@RT | 3.9 +/− 1.60 | 476.6 +/− 237.90 |
| .50% SW Heal@RT | 3.5 +/− 0.55 | 326.4 +/− 159.20 |
| .75% SW Heal@RT | 4.0 +/− 1.03 | 326.4 +/− 99.00 |
| 1% SW Heal@RT | 4.1 +/− 1.30 | 324.2 +/− 159.20 |
| .25% MW Heal@RT | 3.5 +/− 1.10 | 620.8 +/− 262.70 |
| .50% MW Heal@RT | 4.6 +/− 1.23 | 435.6 +/− 142.50 |
| .75% MW Heal@RT | 4.0 +/− 1.50 | 346.4 +/− 217.60 |
| 1% MW Heal@RT | 4.7 +/− 0.63 | 397.6 +/− 95.01 | to tensile testing, pressed back together and left to mend at 25° C. for 24 hours. The results are reported in Table 3.

Only the ultimate stress at break is given for comparison for these samples. Key results are that the neat poly(carbonate urethane) self-heals. Further, strength is increased by both single and multi-wall CNTs. The stress values increased with nanotube level up to about 50% and then decreased.

Time effects were also explored by subjecting 1% single and multi-wall CNT PCU composites to rupture by cutting into two halves and then delaying the time the segments were brought into contact immediately (I), after 1 hour (1), 8 hours (8) and 24 hours (24) (Table 4).

TABLE 4

Separation Test Results

| Sample: all samples healed 24 h @ 25° C. | Average stress @break (Mpa) | Average strain @break(% ini.) |
|---|---|---|
| Immediate PCPU neat | 4.22 | 735 |
| Immediate SWCNT | 5.43 | 752 |
| Immediate MWCNT | 5.23 | 758 |
| 1 hour wait PCPU neat | 2.20 | 353 |
| 1 hour wait SWCNT | 5.05 | 749 |
| 1 hour wait MWCNT | 4.96 | 857 |
| 8 hour wait PCPU neat | 1.13 | 58 |
| 8 hour wait SWCNT | 2.09 | 230 |
| 8 hour wait MWCNT | 1.73 | 194 |
| 24 hour wait PCPU neat | 1.37 | 73 |
| 24 hour wait SWCNT | 1.37 | 151 |
| 24 hour wait MWCNT | 1.36 | 128 |

Single-wall CNT composites retained the ability to reheal after time delay better than the multi-wall CNT composites. It is interesting to note that even the 24 hour samples retained enough affinity to remain together after light pressure was applied.

The synthesis of a series of polymers with varying 3-methyl-1,5-pentanediol contents, varying hard segment contents, and varying nanotube contents yields leads to strong, reversible self-healing systems.

The claimed invention uses carbon nanotubes for reinforcement and to enhance self-healing. It does not use the nanotubes to release any type of healing agent into the matrix.

It is one object of the claimed invention to synthesize a systematic series of linear thermoplastic polyurethanes using the starting materials in table 5.

TABLE 5

Raw materials

| | Ratio % |
|---|---|
| Polyols | |
| 1,6 Hexane diol/3-Me-1,5 Pentane diol Poly (Hexylmethylene carbonate) diol | 70/30 |
| Chain extender | |
| 1,4 butane diol | |
| 2-methyl-1,3-propane diol | |
| 1,5 pentane diol | |
| 2-methyl-1,4-butane diol | |
| Isocyanate | |
| Monomeric Diphenylmethane 4,4'-Diisocyanate bis(4-isocyanotocyclohexyl) methane | |
| Catalyst | |
| Tin 2-ethylhexanoate | |

A novel polycarbonate polyol containing 2-methyl-1,5-pentane diol was found to yield ultra-soft, non-blocking polyurethanes. The low hardness comes about by minimizing crystallinity by the appended methyl group in the diol. However, it is important to demonstrate the effect of hard segment content, polyol chemistry and chain extender on self-healing properties. The hard segment chemistry testing chain extenders in additional to 1,4-butane diol was also altered.

It is a further object to process MWCNT and SWCNT composites and characterize the neat polymers and nanocomposites.

Experimental Results

Synthesize of a systematic series of linear thermoplastic polyurethanes. Table 5 lists the polyols, chain extenders, isocyanate and catalyst used in this experiment. The original polymer contained 23% hard segment (molar amounts of methylene diphenyl isocyanate and 1,4 butane diol). The polyether polyol (6,000 molar mass) contained 1,6-hexane diol and 3-methyl-1,5-pentanediol in a 70/30 mole ratio. The 3-methyl-1,5-pentanediol inhibited crystallization in the polycarbonate diol. The resulting polyurethane (60,000 g mol$^{-1}$) was never optimized for self-healing applications. The following will be varied:

Polycarbonate diol: the 1,6-hexane diol/3-methyl-1,5-pentanediol polycarbonate (6,000 g mol$^{-1}$) will be mixed in ratios varying from 0 to 100 mole percent with 1,6-hexane diol polycarbonate (6,000 g mol$^{-1}$).

Hard segment ratio will be varied starting at 23% and working up or down depending on the chain extender used. (Note: hard segment is defined as the percent by weight of the isocyanate and chain extender in the polymer).

Chain extender chemistry will be varied and includes 1,4-butanediol, 2-methyl-1,3-propane diol, 1,5-pentane diol and 2-methyl-1,4-butanediol. The purpose is to test the effect of steric hindrance due to appended methyl groups on the hard segment properties. The methyl group appended on the carbonate diol greatly influenced the behavior of the polyurethane studied earlier.

Thermoplastic polyurethanes is prepared either via a one shot reaction or by two shot reaction route to determine soft segment and hard segment order effects on the resulting material. The one shot method consists of reacting the hydroxyl groups of the polycarbonate copolymer and chain extender with the isocyanate groups of the diisocyanate in the appropriate equivalent weight ratio in one step. The two shot method consists of first making a prepolymer by first reacting a portion of the hydroxyl groups of the polycarbonate copolymer with isocyanate groups of the diisocyanate to generate diisocyanate terminated prepolymer having the desired percentage of isocyanate. Then the remaining hydroxyl groups of the polycarbonate copolymer and chain extender are reacted with the isocyanate terminated prepolymer at the appropriate equivalent weight ratio. (Note: Chain extender and polyols will be thoroughly dried before the reaction.)

One Shot Method

Polycarbonate copolymer is charged into a reactor equipped with constant nitrogen blanketing and a heating mantle with controlled temperature and mixing, the temperature is maintained between 60 and 80° C. The low molecular weight chain extender is then added and mixed. The catalyst, tin 2-ethyl hexanoate is added, stirred and a slight stoichiometric excess of diisocyanate is added. The resulting polyurethane is placed in an oven at 107° C. for two hours for curing and then the temperature is dropped to 93° C. for post curing. The post curing is continued until the absence of isocyanate groups absorption at 2264 cm$^{-1}$ is confirmed by FTIR spectrometry. All samples were aged seven days before continuing.

Two Shot Method

Step 1:

The diisocyanate is charged into a reactor equipped with constant nitrogen blanketing and a heating mantle with controlled temperature and mixing. The polycarbonate copolymer is then added to the isocyanate targeting the desired % NCO. A small amount of catalyst is added. The mixture is heated to 100° C. and allowed to react for several hours. The result is an isocyanate terminated prepolymer.

Step 2

The polycarbonate copolymer is charged into a 2 L reactor equipped with constant nitrogen blanketing and a heating mantle with controlled temperature and mixing, and the temperature is maintained between 60-80° C. The low molecular weight chain extender is then added and mixed. A small amount of tin 2-ethyl hexanoate is then added. The prepolymer is then added to this mixture in a slight stoichiometric excess and mixed thoroughly. The resulting thermoplastic urethane is then placed in an oven at 107° C. for two hours for curing and then the temperature is dropped to 93° C. while post curing. The post curing is continued until the absence of isocyanate groups absorption at 2264 cm$^{-1}$ is confirmed by FTIR spectrometry. All samples were aged seven days before continuing.

Note: PUs prepared via these methods appears to dissolve and produce clear solutions. However, small branched components have been isolated via a 2 micron filter. It is known that, for example, allophanates form during these reactions. More so, at higher temperatures. The will be monitored. Catalyst and temperature will be adjusted to minimize this. It is likely than branching effects the self-healing process.

MWCNT and SWCNT composites are processed. AP grade SWCNT (1.20-1.5 nm D) and MWCNT (30-50 nm O.D. and 5-15 I.D.) will be used as received from Sigma. PU, 5% by weight) will be dissolved in tetrahydrofuran (THF) under stirring for 6 hours. Nanotubes will be added and the mixture (0.10-1.0% by weight) will be sonicated for 2 hours with a Branson Sonifier 250. The mixture will be poured in a shallow pan on a shaker (200 RPM) and placed in a hood until the THF evaporates. Samples will be removed from the pan and vacuum dried for 12 hours at 50°. Note: IF scanning electron microscopy reveals poor dispersion a rapid solvent casting method will be used to enhance dispersion.

Carbonate polyols made using any carbonates listed in Table 6 with any of the diols listed under chain extenders.

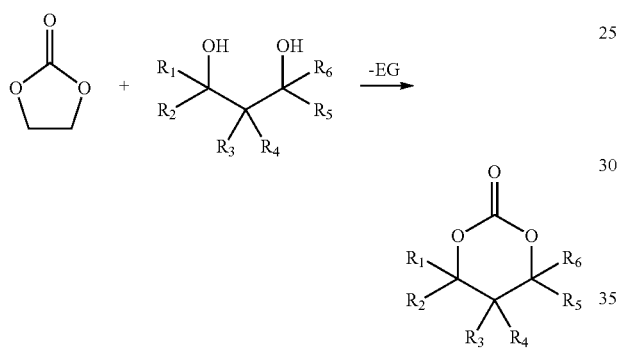

TABLE 6

| $R_1$ | $R_2$ | $R_3$ | $R_4$ | $R_5$ | $R_6$ | Bp (° C.) | Yield (%) |
|---|---|---|---|---|---|---|---|
| $CH_3$ | $CH_3$ | H | H | $CH_3$ | H | 197 | 39.8 |
| $CH(CH_3)_2$ | H | $CH_3$ | $CH_3$ | H | H | 232 | 59.6 |
| $CH_3$ | H | H | H | H | H | 203 | 35.1 |
| H | H | $C_2H_5$ | $C_4H_9$ | H | H | 262 | 59.6 |
| $C_3H_7$ | H | $C_2H_5$ | H | H | H | 244 | 76.2 |

Chain Extenders:

1. Ethane-1,2-diol (ethylene glycol, glycol), C2H4O2, HO—CH$_2$—CH$_2$—OH, 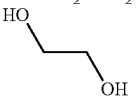

2. Propane-1,2-diol, CH$_3$—CH(OH)—CH$_2$—OH, 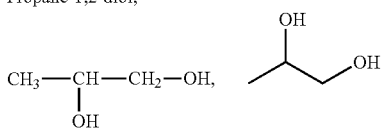

3. Propane-1,3-diol, HO—CH$_2$—CH$_2$—CH$_2$—OH, 

4. Propane-1,2,3-triol (glycerol), HO—CH$_2$—CH(OH)—CH$_2$—OH, 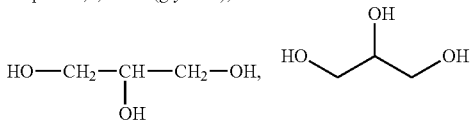

5. Butane-1,2-diol, CH$_3$—CH$_2$—CH(OH)—CH$_2$—OH, 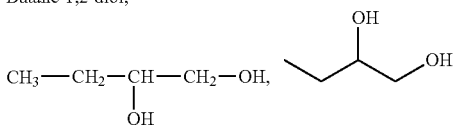

6. Butane-1,3-diol, CH$_3$—CH(OH)—CH$_2$—CH$_2$—OH, 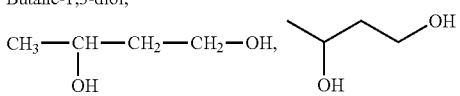

7. Butane-1,4-diol, HO—CH$_2$—CH$_2$—CH$_2$—CH$_2$—OH, 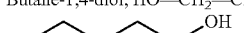

8. Butane-2,3-diol, CH$_3$—CH(OH)—CH(OH)—CH$_3$, 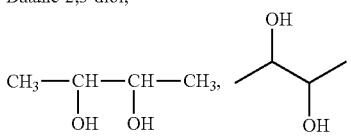

9. Butane-1,2,3-triol, HO—CH$_2$—CH(OH)—CH(OH)—CH$_3$, 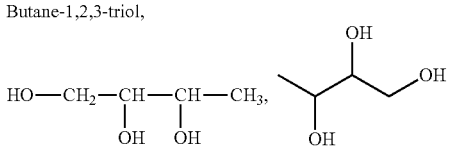

10. Butane-1,2,4-triol, HO—CH$_2$—CH(OH)—CH$_2$—CH$_2$—OH, 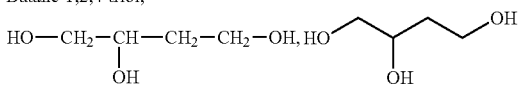

11. Pentane-1,2-diol, CH$_3$—CH$_2$—CH$_2$—CH(OH)—CH$_2$—OH, 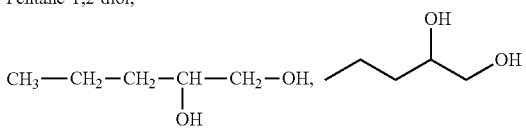

12. Pentane-1,3-diol, CH$_3$—CH$_2$—CH(OH)—CH$_2$—CH$_2$—OH, 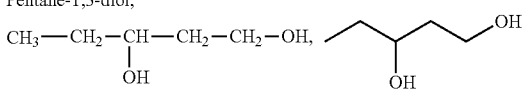

13. Pentane-1,4-diol, CH$_3$—CH(OH)—CH$_2$—CH$_2$—CH$_2$—OH, 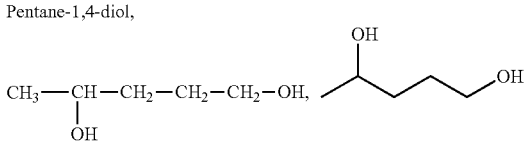

14. Pentane-1,5-diol, HO—CH$_2$—CH$_2$—CH$_2$—CH$_2$—CH$_2$—OH, 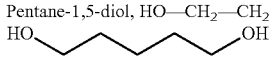

15. Pentane-2,3-diol, CH$_3$—CH$_2$—CH(OH)—CH(OH)—CH$_3$, 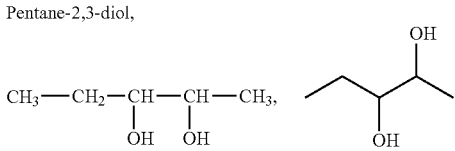

16. Pentane-2,4-diol,

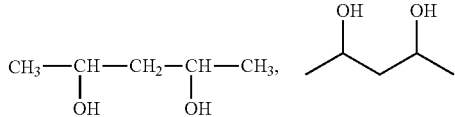 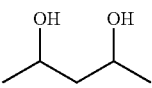

17. Hexane-2,3-diol,

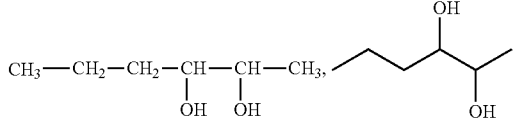 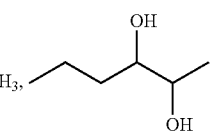

18. Hexane-2,5-diol,

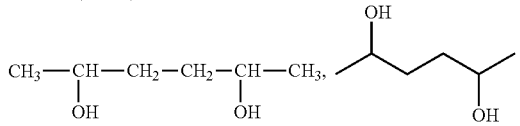 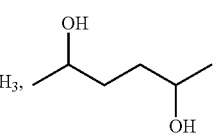

19. Cyclopentanol (cyclopentyl alcohol),

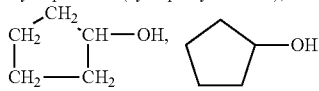 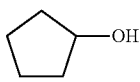

20. Cyclopentane-1,2-diol,

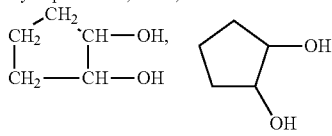 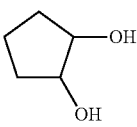

21. Cyclopentane-1,3-diol,

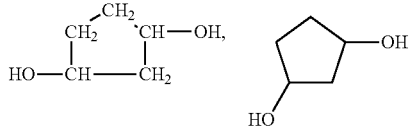 [SMILES: OC1CCC(O)C1 ; OC1CCC(O)C1] 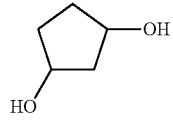

22. diol,

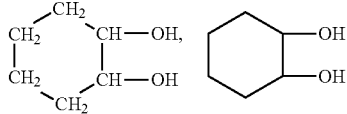 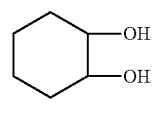

23. Cyclohexane-1,3-diol,

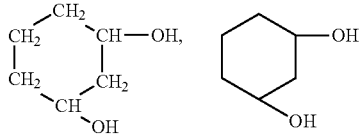 [SMILES: OC1CCCC(O)C1 ; OC1CCCC(O)C1] 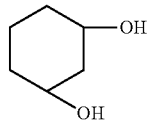

24. Cyclohexane-1,4-diol,

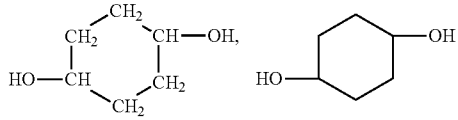 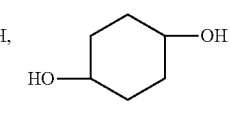

Diisocyanate Structure:

| Name | Structure |
| --- | --- |
| 1,6-hexamethylene diisocyanate (HDI) | OCN—(CH$_2$)$_6$—NCO |
| isophorone diisocyanate (IPDI) | |
| 4,4'-dicyclo-hexylmethane diisocyanate (H$_{12}$MDI) * | |
| 1,4-cyclohexane diisocyanate (CHDI) * | |
| bis(isocyanato-methyl)cyclo-hexane (H$_4$XDI,DDI) * | |

Carbonate Polyols

Polycabonante polyols made using any combination of the glycols listed in the chain extender section.

Nanofillers:
gold
iron oxide
silicon carbide
titanium carbide
diamond
boron nitride
Fullerenes (C60)
Single-walled carbon nanotubes (SWCNTs)
Multi-walled carbon nanotubes (MWCNTs)
Silver nanoparticles
Iron nanoparticles
Carbon black
Titanium dioxide
Aluminum oxide
Cerium oxide
Zinc oxide
Silicon dioxide
Polystyrene
Dendrimers
Nanoclays
Copper sulfate It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. A self-healing polyurethane rubber, comprising:
a thermoplastic polyurethane synthesized from 3-methyl-1,5-pentanediol, poly(hexylmethylene carbonate)diol, a chain extender, and an isocyanante in the presence of a catalyst, and further comprising carbon nanotubes dispersed within the polyurethane at a concentration of about 0.25 percent to about 1 percent by weight, the polyurethane having stress at break of about 5 Mpa or greater and elongation at break of about 700 percent or greater after the polyurethane is separated and allowed to self-heal for about 24 hours.

2. The self-healing polyurethane rubber of claim 1, wherein the nanotubes are single-walled.

3. The self-healing polyurethane rubber of claim 1, wherein the nanotubes are multi-walled.

4. The self-healing polyurethane rubber of claim 1, wherein the chain extender comprises 1,4-butane diol, 2-methyl-1,3-propane diol, 1,5-pentane diol, 2-methyl-1,4-butane diol.

5. The self-healing polyurethane rubber of claim 1, wherein the isocyanate comprises diphenylmethane 4,4'-diisocyanate, bis(4-isocyanotocyclohexyl)methane.

6. The self-healing polyurethane rubber of claim 1, wherein the 3-methyl-1,5-pentanediol is mixed with 1,6-hexane diol.

7. The self-healing polyurethane of claim 6, wherein the thermoplastic polyurethane has a hard segment ratio ranging from about 20 to about 27 percent.

8. The self-healing polyurethane rubber of claim 1, wherein there is essentially no time delay between separation and commencement of self-healing.

* * * * *